US012576349B2

(12) United States Patent
Everhard et al.

(10) Patent No.: US 12,576,349 B2
(45) Date of Patent: Mar. 17, 2026

(54) AUTOMATED CONTROL OF HIGH-PRESSURE FILTER SYSTEMS

(71) Applicant: Baker Hughes Oilfield Operations LLC, Houston, TX (US)

(72) Inventors: Eliah M. Everhard, Spring, TX (US);
Ian L. Everhard, Houston, TX (US);
Pedro E. Bolivar, Houston, TX (US);
Jacques J. Camel, Kaplan, LA (US);
William L. Carbrey, Slidell, LA (US)

( * ) Notice: Subject to any disclaimer, the term of this patent is extended or adjusted under 35 U.S.C. 154(b) by 702 days.

(21) Appl. No.: 17/887,748

(22) Filed: Aug. 15, 2022

(65) Prior Publication Data

US 2023/0087791 A1     Mar. 23, 2023

Related U.S. Application Data

(60) Provisional application No. 63/245,373, filed on Sep. 17, 2021.

(51) Int. Cl.
   B01D 29/60      (2006.01)
   B01D 35/147     (2006.01)
(52) U.S. Cl.
   CPC ......... B01D 29/606 (2013.01); B01D 35/147 (2013.01); *B01D 2201/54* (2013.01); *B01D 2221/04* (2013.01)
(58) Field of Classification Search
   CPC ........................... B01D 29/606; B01D 35/147; B01D 2201/54; B01D 2221/04; B01D 35/12
   See application file for complete search history.

(56) References Cited

U.S. PATENT DOCUMENTS

| | | |
|---|---|---|
| 6,641,730 B2 | 11/2003 | Poole |
| 10,252,196 B2 | 4/2019 | Duhon et al. |
| 10,280,713 B2 | 5/2019 | Randle et al. |
| 10,315,138 B2 | 6/2019 | Duhon et al. |
| 2012/0012309 A1 | 1/2012 | Noles, Jr. |
| 2015/0041413 A1 | 2/2015 | Benavides |

FOREIGN PATENT DOCUMENTS

| | | | | |
|---|---|---|---|---|
| CN | 213965502 U | * | 8/2021 | |
| WO | 2006039665 A2 | | 4/2006 | |
| WO | WO-2015023763 A1 | * | 2/2015 | ........... B01D 29/114 |

OTHER PUBLICATIONS

PCT International Search Report and Written Opinion; PCT/US2022/042852; Korean Intellectual Property Office; Mailed Dec. 28, 2022; 9 pages.

* cited by examiner

*Primary Examiner* — Waqaas Ali
(74) *Attorney, Agent, or Firm* — Baker Hughes Company

(57) ABSTRACT

Examples described herein provide a method that includes determining, by a processing device, a first pressure differential across a first high-pressure filter of an automated high-pressure filter system. The method further includes selectively controlling, by the processing device and based at least in part on the first pressure differential, a switching unit of the automated high-pressure filter system to cause fluid to selectively flow through at least one of the first high-pressure filter and a bypass line of the automated high-pressure filter system.

10 Claims, 4 Drawing Sheets

300

Determine A Pressure Differential Across A High-Pressure Filter Of An Automated High-Pressure Filter System <u>302</u>

Selectively Control, Based At Least In Part On The Pressure Differential, A Switching Unit Of The Automated High-Pressure Filter System To Cause Fluid To Selectively Flow Through At Least One Of The High-Pressure Filter And A Bypass Line Of The Automated High-Pressure Filter System <u>304</u>

*FIG. 3*

AUTOMATED CONTROL OF HIGH-PRESSURE FILTER SYSTEMS

CROSS-REFERENCE TO RELATED APPLICATIONS

This application claims the benefit of U.S. Provisional Patent Application No. 63/245,373 filed Sep. 17, 2021, the disclosure of which is incorporated herein by reference in its entirety.

BACKGROUND

Embodiments described herein relate generally to downhole exploration and production efforts in the resource recovery industry and more particularly to techniques for automated control of high-pressure filter systems.

The resource recovery industry uses fluids such as drilling fluids, completion fluids, etc., during operation. In the case of completion fluids, for example, when debris is pumped or introduced downhole, such debris can become lodged in downhole equipment or production tools and impairs their performance or causes failure. Free-floating debris, such as drilling mud solids, paint chips, pipe dope, metal shavings, rust shale, fibers, and other associated debris, are typically found in the completion fluids. Accumulation of this collective array of debris can lead to equipment failure or cause other problems.

A high-pressure filter, such as a high-pressure debris filtration unit (HPDU), removes solid debris from fluids used in the resource recovery industry. For example, an HPDU can remove solid debris from completion fluids being pumped through a surface drilling rig circulation system prior to flowing downhole.

SUMMARY

Embodiments of the present invention are directed to automated high-pressure filter systems.

A non-limiting example method includes determining, by a processing device, a first pressure differential across a first high-pressure filter of an automated high-pressure filter system. The method further includes selectively controlling, by the processing device and based at least in part on the first pressure differential, a switching unit of the automated high-pressure filter system to cause fluid to selectively flow through at least one of the first high-pressure filter and a bypass line of the automated high-pressure filter system.

A non-limiting example automated high-pressure filter system includes a first high-pressure filter; a second high-pressure filter; a switching unit fluidly connected to the first high-pressure filter and the second high-pressure filter; and a controller. The controller determines a first pressure differential across the first high-pressure filter. The controller further determines a second pressure differential across the second high-pressure filter. The controller further selectively controls the switching unit based at least in part on at least one of the first pressure differential or the second pressure differential.

A non-limiting example automated high-pressure filter system includes a high-pressure filter having a valve actuator, a first filter canister, a second filter canister, and an integrated bypass line. The automated high-pressure filter system further includes a controller. The controller determines a pressure differential across the high-pressure filter. The controller further selectively controls the valve actuator based at least in part on the pressure differential to cause fluid to flow through at least one of the group consisting of the first filter canister, the second filter canister, and the integrated bypass line.

The above features and advantages, and other features and advantages, of the disclosure are readily apparent from the following detailed description when taken in connection with the accompanying drawings.

BRIEF DESCRIPTION OF THE DRAWINGS

Referring now to the drawings wherein like elements are numbered alike in the several figures:

FIG. 3 depicts a flow diagram of a method for controlling an automated high-pressure filter system according to one or more embodiments described herein.

DETAILED DESCRIPTION

Figure 1A:
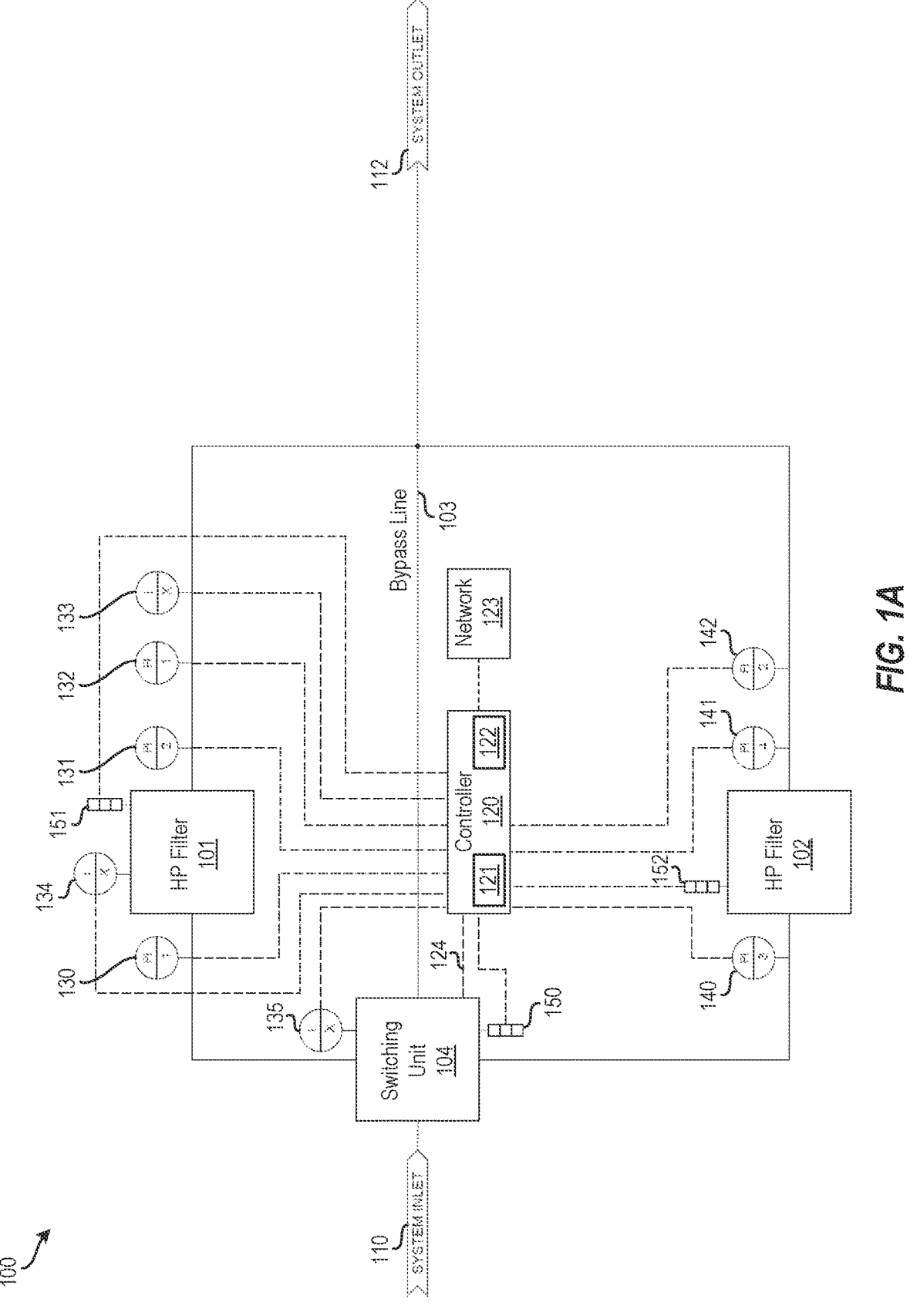
FIG. 1A depicts a block diagram of an automated high-pressure filter system according to one or more embodiments described herein.

Downhole exploration and production efforts in the resource recovery industry relate to locating, evaluating, and extracting resources, such as hydrocarbons, from the earth. For example, wellbores are drilled into a subsurface to produce hydrocarbons and for other purposes. Fluids, such as drilling fluids and completion fluids are often used in the resource recovery industry. Drilling fluids (also referred to as "drilling mud") are used in the drilling of boreholes into the earth to provide hydrostatic pressure in the borehole, to cool and clean the drill bit of a drill, and to carry cuttings out of the boreholes, among other functions.

Completion fluids are used in the completion phase of a wellbore operation to prepare the wellbore for production. During completion, it is desirable to prevent solids from being introduced in the wellbore. Because they can contain debris, completion fluids are often filtered to remove any debris before being used. For example, free-floating debris, such as drilling mud solids, paint chips, pipe dope, metal shavings, rust shale, fibers, and other associated debris, are typically found in the completion fluids. Accumulation of this collective array of debris can lead to equipment failure, reduce production, and/or cause other problems.

A high-pressure (HP) filter, such as a high-pressure debris filtration unit (HPDU), removes solid debris from fluids, such as completion fluids, used in the resource recovery industry. An HP filter is located between one or more high-pressure pumps and a wellbore standpipe with the purpose of removing and isolating debris from the fluids. Conventionally, HP filters are operated manually. In some configurations, multiple HP filters are used at a wellbore operation. In some conventional implementations, HP filters operate at high pressures, which means that wellbore fluid circulation must be stopped to change positions of valves of the HP filter, to service the HP filter, etc. For example, in wellbore operations that utilize conventional HP filters, high-pressure fluid pumps that circulate wellbore fluid must be de-energized for some period of time so that no pressure is on the HP filters in order to change from one HP filter to another HP filter, which may be done for maintenance/ service. Further, the pumps need to be de-energized during instances where well operations require a viscous pill or other similar treatment to be circulated, which must bypass the HP filters. De-energizing the pumps put strain on the pumps, causing potential failures and/or reduced life expectancy, can cause non-productive time of the wellbore operation, and can affect the fluid properties of the circulating fluid (e.g., rheology).

To address these shortcomings of the prior art, one or more embodiments herein provide for automated control of a high-pressure filter system. For example, one or more valves of the automated HP filter system can be activated remotely to improve reliability, to enable fluid switching within the automated HP filter system, to enable an HP filter of the automated HP filter system to be serviced, reconfigured, etc., while the wellbore fluid circulation continues (e.g., while the high-pressure pumps remain energized), and the like.

According to one or more embodiments described herein, techniques are provided for filtering debris from wellbore fluids using an automated HP filter system. The automated HP filter system uses sensors to monitor parameters such as pressure or flow rate of fluid flowing through the automated HP filter system at one or more locations and can actuate one or more valves of the automated HP filter system based on the sensed pressure or flow rate of the fluid. The automated HP filter system can be controlled to switch flow of fluid between or among multiple HP filters, to bypass one or more HP filters, and the like.

Figure 2:
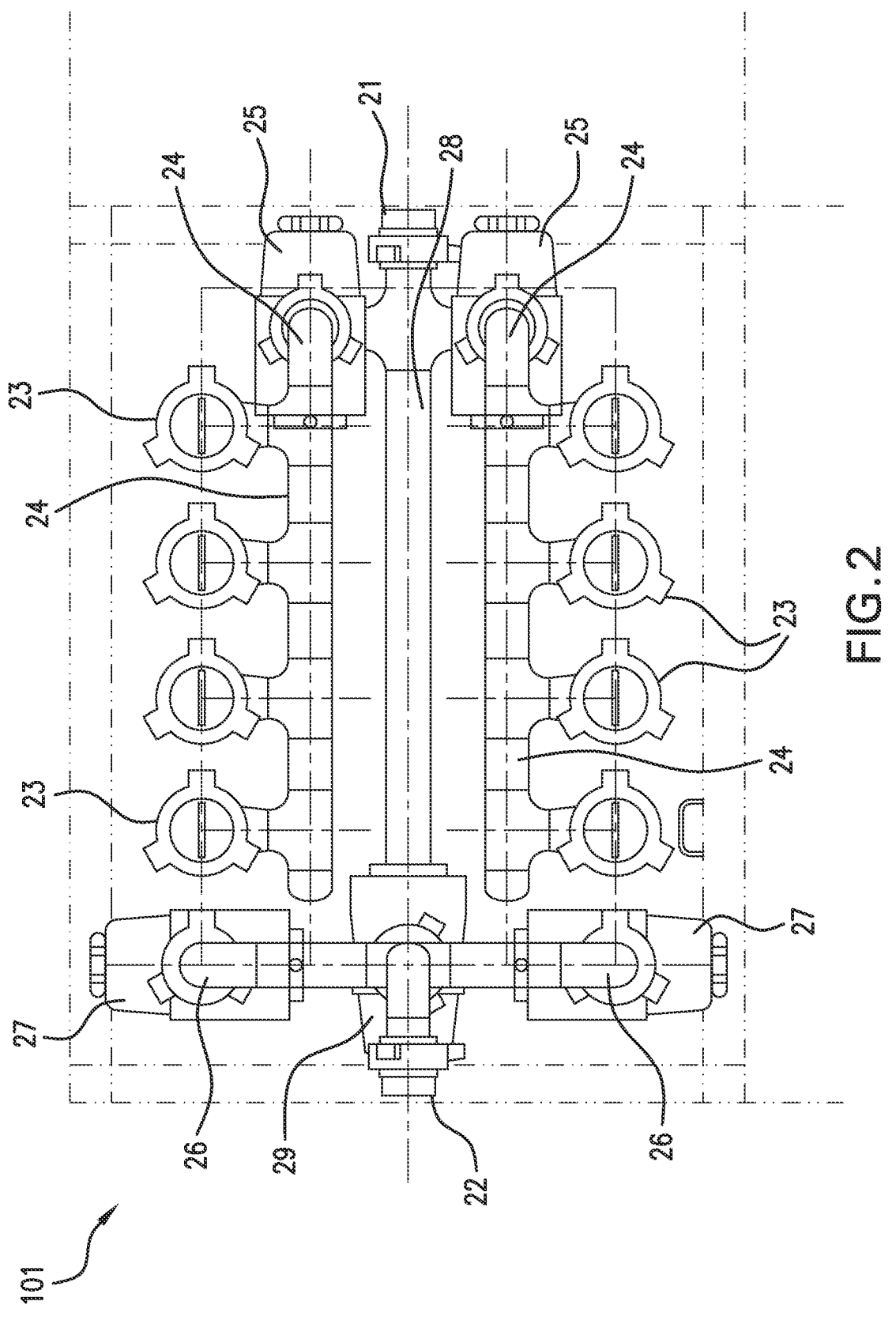
FIG. 2 depicts a schematic diagram of a high-pressure filter, such as one of the high-pressure filters of FIG. 1A or 1B, according to one or more embodiments described herein.

FIG. 1A depicts a block diagram of an automated high-pressure filter system 100 according to one or more embodiments described herein. The automated HP system 100 includes two high-pressure (HP) filters: HP filter 101 and HP filter 102. It should be appreciated that one or more additional HP filters can be added in other examples, as well as a single HP filter. HP filters 101, 102 are examples of high-pressure filters (e.g., HPDUs) that can include one or more filter canisters (e.g., eight (8) filter canisters) fluidly connected between an inlet and an outlet. FIG. 2 depicts a schematic diagram of an HP filter, such as the HP filter 101, according to one or more embodiments described herein. In the embodiment of FIG. 2, the HP filter 101 comprises an inlet 21 and an outlet 22. The HP filter 101 also has, according to this embodiment, eight filter canisters 23. As shown in the drawings, the filter canisters 23 are oriented vertically. The inlet 21 is connected to the tops of the filter canisters 23 by two input feed lines 24. The input feed lines are each equipped with an input valve 25. The outlet 22 is connected to the bottoms of the filter canisters 23 by two output feed lines 26. The output feed lines 26 are each equipped with an output valve 27. The high-pressure filter 20 also includes a bypass line 28 which extends from the inlet 21 to the outlet 22, and the bypass line 28 also has a bypass valve 29. It should be appreciated that the bypass line 28 can be the same bypass line as the bypass line 103 of FIG. 1A. It should further be appreciated that multiple HP filters can share a bypass line, such as the bypass line 103. High-pressure filters, such as HP filters 101, 102, are further described in U.S. Pat. No. 6,641,730, assigned to Baker Hughes Holdings, LLC, and titled "Integrated Debris Management System" is incorporated by reference herein in its entirety.

With continued reference to FIG. 1A, HP filters 101, 102 are fluidly connected to a switching unit 104. As used herein, fluidly connected (or a fluid connection) means that fluid (e.g., completion fluid) is able to flow from one component to another component either directly (e.g., one component is directly connected to the other component) or indirectly (e.g., one component is indirectly connected to the other component by one or more pipes, couplings, etc.). The solid lines between/among components shown in FIG. 1A represent fluid connections through which fluid can flow. The switching unit 104 receives fluid at a system inlet 110. The system inlet 110 may represent the output of another component or system, such as an output by one or more high-pressure pumps (not shown). The fluid can selectively flow through the HP filter 101, the HP filter 102, and/or a bypass line 103, and the fluid then exits the automated HP filter system 100 at a system outlet 112. For example, an outlet (not shown) of the switching unit 104 can be fluidly connected to the inlet 21 of the HP filter 101. Similarly, an outlet (not shown) of the switching unit 104 can be fluidly connected to an inlet of the HP filter 102 and/or to the system outlet 112 via the bypass line 103. The switching unit 104 can include a valve actuator communicatively coupled to the controller 120 by the link 124 so that the controller 120 can cause the switching unit 104 to direct fluid from the system inlet 110 to the system outlet 112 through one or more of the HP filter 101, the HP filter 102, and/or the bypass line 103. The valve actuator can be electrically powered, hydraulically actuated, pneumatically actuated, etc.

The automated HP filter system 100 also includes a controller 120 for selectively controlling the switching unit 104. The features and functionality of the controller 120 described herein can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to one or more embodiments described herein, the controller can implement a combination of hardware and programming to perform operations. The programming can be processor executable instructions stored on a tangible memory (e.g., a memory 122), and the hardware can include a processing device 121 for executing those instructions. Thus the memory 122 can store program instructions that when executed by the processing device 121 implement the engines described herein. Other engines can also be utilized to include other features and functionality described in other examples herein.

According to one or more embodiments described herein, the controller 120 is communicatively connected to a network 123. As used herein, communicatively connected (or a communicative connection) means data can be communicated over the connection. For example, the controller 120 can communicate with another device (not shown), such as a remote processing system, via the network 123. The dashed lines between/among components shown in FIG. 1A represent communicative connections through which the components can communicate (e.g., transfer data, send signals, etc.). According to one or more embodiments described herein, the controller 120 further includes a network adapter that provides for the controller 120 to transmit data to and/or receive data from other sources, such as other processing systems, data repositories, and the like. As an example, the processing system 100 can transmit data to and/or receive data from other sources directly and/or via the network 123. The network 123 represents any one or a combination of different types of suitable communications networks such as, for example, cable networks, public networks (e.g., the Internet), private networks, wireless networks, cellular networks, or any other suitable private and/or public networks. Further, the network 123 can have any suitable communication range associated therewith and may include, for example, global networks (e.g., the Internet), metropolitan area networks (MANs), wide area networks (WANs), local area networks (LANs), or personal area networks (PANs). In addition, the network 123 can include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

The automated HP filter system 100 can also include one or more sensors for sensing properties of the fluid flowing through the automated HP filter system 100 and/or properties of the automated HP filter system 100, including one or more of its components. For example, the HP filter system 100 can include pressure sensors, volumetric flowrate sensors, and other suitable sensors. In the example of FIG. 1A, the automated HP filter system 100 includes: pressure sensors 130, 131, 140, 141; volumetric flowrate sensors 132, 142; and additional sensors 133, 134, 135. The sensors 130-135, 140-142 are communicatively connected to the controller 120 as shown so that the sensors 130-135, 140-142 can transmit information in the form of signals, data, etc., to the controller 120. For example, one or more of the pressure sensors 130, 131, 140, 141 can sense pressure information about the fluid flowing through the automated HP filter system 100 at different points throughout the automated HP filter system 100. As one example, such as shown in FIG. 1A, the pressure sensors 130, 140 sense pressure information about the fluid flowing into the HP filter 101 and the HP filter 102 respectively. Similarly, the pressure sensors 131, 141 sense pressure information about the fluid flowing out of the HP filter 101 and the HP filter 102 respectively.

According to one or more embodiments described herein, data collected by the sensors 130-135, 140-142 can be transmitted via the network 123 to a remote processing system for analysis. Such data may be useful not only for controlling the automated HP filter system 100 but also for controlling other aspects of the wellbore operation and/or to make decisions about other aspects of the wellbore (e.g., decisions related to drilling, fluid composition, solids control equipment efficiency, tank cleaning efficiency, etc.).

The controller 120 can also include one or more light stacks 150, 151, 152, which provide status information about the automated HP filter system 100 as a visual indicator. As one example, the light stack 150 could have three lights as shown, with a first light being associated with the HP filter 101, a second light being associated with the HP filter 102, and a third light being associated with the bypass line 103 such that when fluid is flowing through the HP filter 101, the HP filter 102, and/or the bypass line 103, the respective first, second, or third light of the light stack 150 is illuminated. In examples, the light stacks can have other numbers of lights. In some examples, one or more of the lights of one or more of the light stacks 150, 151, 152 can be different colors than one or more of the other lights of the one or more of the light stacks 150, 151, 152. For example, with reference to the example of the light stack 150, the first light could be a first color (e.g., red), the second light could be a second color (e.g., blue), and the third light could be a third color (e.g., green). In another example, stack lights can indicate operational equipment status (e.g., filtration capacity, unit in bypass mode, unit at a percentage threshold of maximum differential pressure, etc.).

The controller 120 can implement control logic to selectively control the switching unit 104. The control logic defines one or more rules that determine how the switching unit 104 is to be controlled depending on one or more inputs. The controller 120 can take sensed values (e.g., data) from one or more of the sensors 130-135, 140-143 and used the sensed values to determine how and when to control the switching unit 104.

According to one or more embodiments, the control logic can define a pressure differential threshold for one or more of the HP filters 101, 102. The pressure differential threshold defines a difference in pressure of the fluid exiting an HP filter compared to the pressure of the fluid entering the HP filter. For example, the switching unit 104 can be controlled based on pressure differences across the HP filters 101, 102. For the HP filter 101, the sensor 130 can sense a first pressure value and the sensor 131 can sense a second pressure value. A difference between the first pressure value and the second pressure value, which is referred to as differential pressure, can be calculated by the controller 120. When certain conditions relating to the differential pressure are met as defined in the control logic, the controller 120 causes the switching unit 104 to change how fluid is flowing through the automated HP filter system 100. For example, a pressure differential threshold can be set in the control logic. If the pressure differential across the HP filter 101 and/or the HP filter 102 satisfies the pressure differential threshold, the controller 120 may cause the switching unit 104 to change how fluid is flowing through the automated HP filter system 100. For example, if the pressure differential across the HP filter 101 exceeds the pressure differential threshold for the HP filter 101, the controller 120 may cause the switching unit 104 to prevent fluid flow to the HP filter 101, in which case the switching unit 104 is configured to cause the fluid to flow to the HP filter 102 and/or to the bypass line 103. When the pressure differential for an HP filter exceeds the pressure differential threshold, this may indicate that the HP filter needs to be cleaned out. Thus, while the switching unit 104 prevents fluid flow to the HP filter 101, the HP filter 101 can be cleaned out. This arrangement enables the automated HP filter system 100 to continue filtering the fluid using the HP filter 102 such that high-pressure pumps pumping the fluid can continue operating. In the case that the pressure differential across the HP filter 102 (as determined using the sensors 140, 141) also exceeds the pressure differential threshold, the switching unit 104 can be controlled by the controller 120 to cause the switching unit to prevent the flow of fluid through the HP filter 102, in which case fluid flows through the bypass line 103. In some cases, the switching unit 104 can cause the fluid to stop flowing through the HP filter system 100 altogether.

Figure 1B:
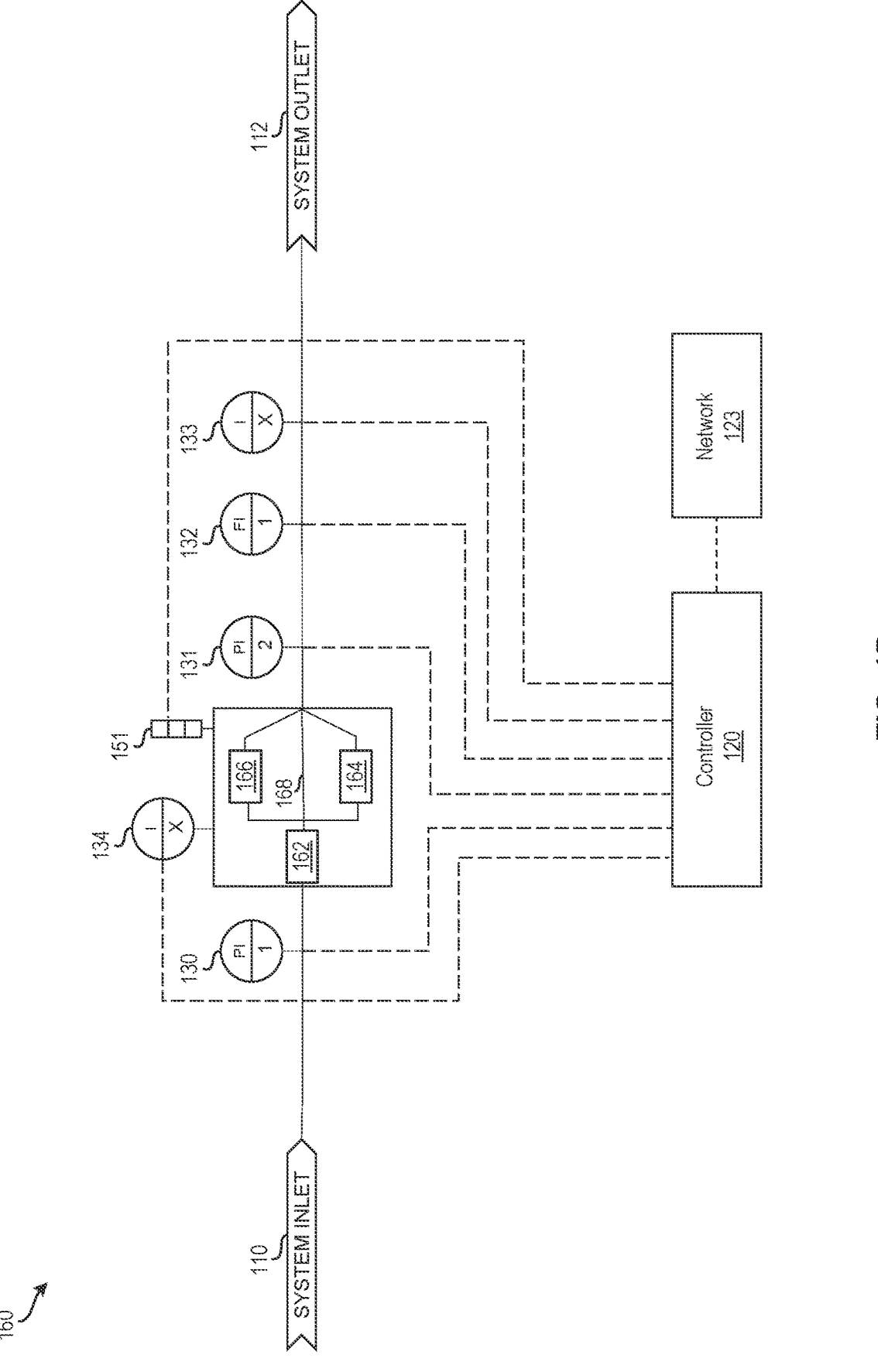
FIG. 1B depicts a block diagram of another automated high-pressure filter system according to one or more embodiments described herein.

In still other cases, the controller 120 can instruct HP filters 101, 102 to direct flow to their own internal bypass, or switch to internal sets of filter screens as shown in FIG. 1B. For example, FIG. 1B depicts a block diagram of an automated high-pressure filter system 160 according to one or more embodiments described herein. In this example, the automated high-pressure filter system 160 includes a single HP filter: the HP filter 101. In this example, the HP filter 101 includes an actuator valve 162, a first filter canister 164 (e.g., one of filter canisters 23), a second filter canister 166 (e.g., another of the filter canisters 23), and an integrated bypass line 168. It should be appreciated that the first filter canister 164 can represent one or more filter canisters fluidly connected; similarly, the second filter canister 166 can represent one or more filter canisters fluidly connected. The actuator valve 162 is controllable by the controller 120 to direct flow of fluid into one or more of the first filter canister 164, the second filter canister 166, and/or the bypass line 168. Since the HP filter 101 has its own integrated bypass line and two selectable filters (e.g., the first filter canister 164 and the second filter canister 166), the controller 120 can selectively control the actuator valve 162 to put the HP filter 101 into an internal bypass mode such that the fluid is directed through the integrated bypass line 168, thereby bypassing the first fluid canister 164 and the second fluid canister 166. For example, if the pressure differential between the sensors 130, 131 exceeds the pressure differential threshold, the controller 120 may cause the actuator valve 162 to cause fluid to flow through the integrated bypass line 168. In another situation, such as where the pressure differential threshold is not exceeded, the controller 120 can cause the actuator valve 162 to cause fluid to flow through both of the first fluid canister 164 and the second fluid canister 166 in parallel. In yet another situation, such as where maintenance or service is to be performed on one of the first fluid canister 164 and the second fluid canister 166, the controller 120 can cause the actuator valve 162 to cause fluid to flow through the other of the first fluid canister 164 and the second fluid canister 166. In yet another situation, the controller 120 can cause the actuator valve 162 to cause fluid to flow through one of the first fluid canister 164 and the second fluid canister 166 and the integrated bypass line 168 in parallel without flowing through the other of the first fluid canister 164 and the second fluid canister 166. These and other scenarios may be possible.

With continued reference to FIGS. 1A and 1B, according to one or more embodiments, the control logic can define a differential pressure rate threshold, which relates to how the differential pressure across an HP filter changes over time. For example, the controller 120 can detect a sudden increase of differential pressure in one or more of the HP filter 101, 102. The sudden increase of differential pressure may be detected by comparing changes in differential pressure over time, and if the change in differential pressure exceeds the differential pressure rate threshold, the controller 120 can cause the switching unit 104 to bypass one or both of the HP filters 101, 102 and send fluid through the bypass line 103.

According to one or more embodiments, the control logic can define a flowrate change threshold, which relates to the flow rate of the fluid through the automated HP filter system 100. The flow rate can be monitored, for example, by the volumetric flowrate sensors 132, 142. If the flow rate, as determined by the sensors 132, 142, exceeds the flowrate change threshold, the control logic can be defined to cause the switching unit 104 to redirect flow to the bypass line 103 (thus bypassing both of the HP filters 101, 102), to direct the flow of fluid simultaneously to the HP filters 101, 102, or another suitable action.

The various thresholds described herein can be configurable depending on the type of HP filter, the type of fluid, the number of HP filters, environmental factors, customer specifications, and/or other parameters. Further, the thresholds can be the same or different for two or more HP filters. For example, the HP filter 101 can have one pressure differential threshold while the HP filter 101 can have another (different) pressure differential threshold.

The specific number and arrangement of components, sensors, etc. shown in FIGS. 1A and 1B are intended to be an example. It should be appreciated that other numbers and arrangements of components are possible. For example, the automated HP filter system 100 can utilize any suitable number and arrangement of HP filters, switching units, sensors, bypass lines, controllers, inlets/outlets, and the like.

Turning now to FIG. 3, a flow diagram of a method 300 for controlling an automated HP filter system (e.g., the automated HP filter system 100 of FIG. 1A, the automated HP filter system 160 of FIG. 1B, etc.) is described according to one or more embodiments described herein. The method 300 can be performed by any suitable processing system and/or processing device. For example, the method 300 can be performed by the controller 120 of FIGS. 1A and 1B.

At block 302, a processing device (e.g., the controller 120) determines a first pressure differential across a first high-pressure filter (e.g., the HP filter 101) of an automated high-pressure filter system (e.g., the automated HP filter system 100). In one or more examples, the processing device determines a second pressure differential across a second high-pressure filter (e.g., the HP filter 102) of the automated high-pressure filter system.

At block 304, the processing device selectively controls, based at least in part on the first pressure differential, a switching unit (e.g., the switching unit 104) to cause fluid to selectively flow through at least one of the first high-pressure filter and a bypass line (e.g., the bypass line 103) of the automated high-pressure filter system. For example, the fluid is directed by the switching unit 104 to flow through 1) the HP filter 101 only, 2) the bypass line 103 only, 3) or a combination of the HP filter 101 and the bypass line 103. In one or more examples, selectively controlling the switching unit includes selectively controlling, based at least in part on at least one of the first pressure differential and the second pressure differential, the switching unit of the automated high-pressure filter system to cause the fluid to selectively flow through at least one of the first high-pressure filter, the second high-pressure filter, and a bypass line of the automated high-pressure filter system. In one or more examples, selectively controlling the switching unit includes controlling the switching unit to increase a flow of fluid to the first high-pressure filter and decrease the flow of fluid to the second high-pressure filter. In one or more examples, selectively controlling the switching unit includes controlling the switching unit to increase a flow of fluid to the first high-pressure filter and prevent the flow of fluid to the second high-pressure filter. In one or more examples, selectively controlling the switching unit includes the switching unit to decrease a flow of fluid to the first high-pressure filter and decrease the flow of fluid to the second high-pressure filter. In one or more examples, selectively controlling the switching unit includes controlling the switching unit to increase a flow of fluid to the bypass line. The bypass line can bypass the first high-pressure filter and the second high-pressure filter.

Additional processes also may be included. For example, the method 300 can include receiving a first pressure value from a first pressure sensor (e.g., the sensor 130) associated with the first high-pressure filter to sense a first pressure and receiving second pressure value from a second pressure sensor (e.g., the sensor 131) associated with the first high-pressure filter to sense a second pressure. In such an example, the first pressure differential, determined at block 302, is the difference between the first pressure value and the second pressure value. It should be understood that the processes depicted in FIG. 3 represent illustrations, and that other processes may be added or existing processes may be removed, modified, or rearranged without departing from the scope of the present disclosure.

One or more of the embodiments described herein can provide one or more of the following advantages. For example, one or more embodiments provides for an HP filter to be removed, reconfigured, serviced, or otherwise taken off line during operation of the automated HP filter system without having to deenergize high-pressure pumps that pump the fluid through the wellbore operation. Further, embodiments described herein provide for real-time or near-real-time control of the automated HP system by using sensors located throughout the automated HP system to control a switching unit using a controller. This enables the automated HP system to quickly react and adjust to changing conditions (e.g., changes in pressure differential, changes to flowrate, etc.). These advantages improve the performance of high-pressure filters (e.g., by bypassing an HP filter to avoid an adverse change to flowrate), decrease non-productive time of the wellbore operation (e.g., by enabling one HP filter to be serviced, removed, reconfigured, etc. without having to stop fluid flow through the wellbore operation), and the like. This increases hydrocarbon recovery from a hydrocarbon reservoir compared to conventional techniques and extends expected equipment lifetime.

Set forth below are some embodiments of the foregoing disclosure:

Embodiment 1: A method comprising: determining, by a processing device, a first pressure differential across a first high-pressure filter of an automated high-pressure filter system; and selectively controlling, by the processing device and based at least in part on the first pressure differential, a switching unit of the automated high-pressure filter system to cause fluid to selectively flow through at least one of the first high-pressure filter and a bypass line of the automated high-pressure filter system.

Embodiment 2: A method according to any prior embodiment, further comprising determining a second pressure differential across a second high-pressure filter of the automated high-pressure filter system.

Embodiment 3: A method according to any prior embodiment, wherein selectively controlling the switching unit comprises: selectively controlling, based at least in part on at least one of the first pressure differential and the second pressure differential, the switching unit of the automated high-pressure filter system to cause the fluid to selectively flow through at least one of the first high-pressure filter, the second high-pressure filter, and the bypass line of the automated high-pressure filter system.

Embodiment 4: A method according to any prior embodiment, wherein selectively controlling the switching unit comprises controlling the switching unit to increase a flow of fluid to the first high-pressure filter and decrease the flow of fluid to the second high-pressure filter.

Embodiment 5: A method according to any prior embodiment, wherein selectively controlling the switching unit comprises controlling the switching unit to increase a flow of fluid to the first high-pressure filter and prevent the flow of fluid to the second high-pressure filter.

Embodiment 6: A method according to any prior embodiment, wherein selectively controlling the switching unit comprises controlling the switching unit to decrease a flow of fluid to the first high-pressure filter and decrease the flow of fluid to the second high-pressure filter.

Embodiment 7: A method according to any prior embodiment, wherein selectively controlling the switching unit comprises controlling the switching unit to increase a flow of fluid to the bypass line.

Embodiment 8: A method according to any prior embodiment, wherein the bypass line bypasses the first high-pressure filter and the second high-pressure filter.

Embodiment 9: A method according to any prior embodiment, further comprising: receiving a first pressure value from a first pressure sensor associated with the first high-pressure filter to sense a first pressure; and receiving second pressure value from a second pressure sensor associated with the first high-pressure filter to sense a second pressure.

Embodiment 10: A method according to any prior embodiment, wherein the first pressure differential is a difference between the first pressure value and the second pressure value.

Embodiment 11: An automated high-pressure filter system comprising: a first high-pressure filter; a second high-pressure filter; a switching unit fluidly connected to the first high-pressure filter and the second high-pressure filter; and a controller to: determine a first pressure differential across the first high-pressure filter; determine a second pressure differential across the second high-pressure filter; and selectively control the switching unit based at least in part on at least one of the first pressure differential or the second pressure differential.

Embodiment 12: An automated high-pressure filter system according to any prior embodiment, wherein to selectively control the switching unit comprises controlling the switching unit to increase a flow of fluid to the first high-pressure filter and decrease the flow of fluid to the second high-pressure filter.

Embodiment 13: An automated high-pressure filter system according to any prior embodiment, wherein to selectively control the switching unit comprises controlling the switching unit to increase a flow of fluid to the first high-pressure filter and prevent the flow of fluid to the second high-pressure filter.

Embodiment 14: An automated high-pressure filter system according to any prior embodiment, wherein to selectively control the switching unit comprises controlling the switching unit to decrease a flow of fluid to the first high-pressure filter and decrease the flow of fluid to the second high-pressure filter.

Embodiment 15: An automated high-pressure filter system according to any prior embodiment, wherein the switching unit is fluidly connected to a bypass line that bypasses the first high-pressure filter and the second high-pressure filter, and wherein to selectively control the switching unit comprises controlling the switching unit to increase a flow of fluid to the bypass line.

Embodiment 16: An automated high-pressure filter system according to any prior embodiment, wherein the controller is communicatively connected to a network.

Embodiment 17: An automated high-pressure filter system according to any prior embodiment, further comprising: a first pressure sensor associated with the first high-pressure filter to sense a first pressure; and a second pressure sensor associated with the first high-pressure filter to sense a second pressure.

Embodiment 18: An automated high-pressure filter system according to any prior embodiment, wherein the first pressure differential is a difference between the first pressure and the second pressure.

Embodiment 19: An automated high-pressure filter system according to any prior embodiment, further comprising: a third pressure sensor associated with the second high-pressure filter to sense a third pressure; and a fourth pressure sensor associated with the second high-pressure filter to sense a fourth pressure, wherein the second pressure differential is a difference between the third pressure and the fourth pressure.

Embodiment 20: An automated high-pressure filter system comprising: a high-pressure filter comprising a valve actuator, a first filter canister, a second filter canister, and an integrated bypass line; and a controller to: determine a pressure differential across the high-pressure filter; and selectively control the valve actuator based at least in part on the pressure differential to cause fluid to flow through at least one of the group consisting of the first filter canister, the second filter canister, and the integrated bypass line.

The use of the terms "a" and "an" and "the" and similar referents in the context of describing the present disclosure (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure can be used in a variety of well operations. These operations can involve using one or more treatment agents to treat a formation, the fluids resident in a formation, a wellbore, and/or equipment in the wellbore, such as production tubing. The treatment agents can be in the form of liquids, gases, solids, semi-solids, and mixtures thereof. Illustrative treatment agents include, but are not limited to, fracturing fluids, acids, steam, oil, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the present disclosure has been described with reference to an exemplary embodiment or embodiments, it will be understood by those skilled in the art that various changes can be made and equivalents can be substituted for elements thereof without departing from the scope of the present disclosure. In addition, many modifications can be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims. Also, in the drawings and the description, there have been disclosed exemplary embodiments of the present disclosure and, although specific terms can have been employed, they are unless otherwise stated used in a generic and descriptive sense only and not for purposes of limitation, the scope of the present disclosure therefore not being so limited.

What is claimed is:

1. A method comprising:
determining, by a processing device, a first pressure differential across a first high-pressure filter of an automated high-pressure filter system; and
performing, by the processing device, a control process of selectively controlling a switching unit of the automated high-pressure filter system based at least in part on the first pressure differential and control logic, wherein the control process of selectively controlling the switching unit causes a fluid to selectively flow through at least one of:
one or more first filter canisters comprised in the first high-pressure filter;

one or more second filter canisters comprised in the first high-pressure filter;
a bypass line of the first-high pressure filter; and
a bypass line of the automated high-pressure filter system.

2. The method of claim 1, further comprising:
determining a change in a flowrate of the fluid through the automated high-pressure filter system,
wherein the processing device further performs the control process of selectively controlling the switching unit based at least in part on the change in the flowrate of the fluid through the automated high-pressure filter system and the control logic.

3. The method of claim 1, further comprising:
determining a second pressure differential across a second high-pressure filter of the automated high-pressure filter system,
wherein the control process of selectively controlling the switching unit comprises:
selectively controlling, based at least in part on at least one of the first pressure differential and the second pressure differential, the switching unit of the automated high-pressure filter system to cause the fluid to selectively flow through at least one of:
the one or more first filter canisters comprised in the first high-pressure filter,
the one or more second filter canisters comprised in the first high-pressure filter,
the bypass line of the first high-pressure filter,
the second high-pressure filter, and
the bypass line of the automated high-pressure filter system.

4. The method of claim 3, wherein selectively controlling the switching unit comprises controlling the switching unit to increase a flow of fluid to the first high-pressure filter and decrease the flow of fluid to the second high-pressure filter.

5. The method of claim 3, wherein selectively controlling the switching unit comprises controlling the switching unit to increase a flow of fluid to the first high-pressure filter and prevent the flow of fluid to the second high-pressure filter.

6. The method of claim 3, wherein selectively controlling the switching unit comprises controlling the switching unit to decrease a flow of fluid to the first high-pressure filter and decrease the flow of fluid to the second high-pressure filter.

7. The method of claim 3, wherein selectively controlling the switching unit comprises controlling the switching unit to increase a flow of fluid to the bypass line.

8. The method of claim 3, wherein the bypass line bypasses the first high-pressure filter and the second high-pressure filter.

9. The method of claim 1, further comprising:
receiving a first pressure value from a first pressure sensor associated with the first high-pressure filter to sense a first pressure; and
receiving second pressure value from a second pressure sensor associated with the first high-pressure filter to sense a second pressure,
wherein the first pressure differential is a difference between the first pressure value and the second pressure value.

10. The method of claim 1, further comprising:
determining a change in the first differential pressure with respect to time,
wherein the processing device further performs the control process of selectively controlling the switching unit based at least in part on the change in the first differential pressure with respect to time and the control logic.

\* \* \* \* \*